United States Patent
Kowase

(10) Patent No.: US 11,664,166 B2
(45) Date of Patent: May 30, 2023

(54) MULTI-LAYER CERAMIC ELECTRONIC COMPONENT AND METHOD OF PRODUCING THE SAME

(71) Applicant: TAIYO YUDEN CO., LTD., Tokyo (JP)

(72) Inventor: Yusuke Kowase, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 67 days.

(21) Appl. No.: 16/814,772

(22) Filed: Mar. 10, 2020

(65) Prior Publication Data

US 2020/0294720 A1 Sep. 17, 2020

(30) Foreign Application Priority Data

Mar. 11, 2019 (JP) .............................. JP2019-043611

(51) Int. Cl.
*H01G 4/30* (2006.01)
*H01G 4/012* (2006.01)
*H01G 4/12* (2006.01)

(52) U.S. Cl.
CPC .............. *H01G 4/30* (2013.01); *H01G 4/012* (2013.01); *H01G 4/1218* (2013.01)

(58) Field of Classification Search
CPC ........ H01G 4/012; H01G 4/1227; H01G 4/33; H01G 4/248; H01G 4/30; H01G 4/1218
See application file for complete search history.

(56) References Cited

U.S. PATENT DOCUMENTS

| 2006/0264317 A1* | 11/2006 | Banno ................. B32B 18/00 501/138 |
| 2012/0234462 A1 | 9/2012 | Matsui et al. |
| 2015/0041193 A1 | 2/2015 | Lee et al. |
| 2015/0116898 A1* | 4/2015 | Takashima ............ H01G 4/012 361/301.4 |

(Continued)

FOREIGN PATENT DOCUMENTS

| CN | 104347268 A | 2/2015 |
| CN | 107799306 A | 3/2018 |

(Continued)

OTHER PUBLICATIONS

A First Office Action issued by the State Intellectual Property Office of China dated Oct. 10, 2022, for Chinese counterpart application No. 202010161060.7 (7 pages).

(Continued)

*Primary Examiner* — Michael P McFadden
(74) *Attorney, Agent, or Firm* — Law Office of Katsuhiro Arai

(57) ABSTRACT

A multi-layer ceramic electronic component includes a multi-layer unit and a side margin. The multi-layer unit includes a functional unit including internal electrodes laminated in a first direction, and a pair of covers that covers the functional unit from both sides in the first direction, the multi-layer unit satisfying a relationship of (2*t2)/t1≥0.6, where t1 represents a dimension of the functional unit in the first direction and t2 represents a dimension of each of the pair of covers in the first direction. The side margin covers the multi-layer unit in a second direction orthogonal to the first direction.

9 Claims, 9 Drawing Sheets

(56) References Cited

U.S. PATENT DOCUMENTS

| | | | |
|---|---|---|---|
| 2015/0116899 A1* | 4/2015 | Kayatani | H01G 4/232 |
| | | | 361/301.4 |
| 2015/0348712 A1* | 12/2015 | Lee | H01G 4/248 |
| | | | 174/260 |
| 2016/0172109 A1 | 6/2016 | Kobayashi et al. | |
| 2016/0240315 A1* | 8/2016 | Onoue | H01G 4/12 |
| 2017/0018363 A1* | 1/2017 | Tanaka | H01G 4/005 |
| 2018/0061575 A1 | 3/2018 | Mizuno | |
| 2019/0115153 A1* | 4/2019 | Park | H01G 4/1227 |

FOREIGN PATENT DOCUMENTS

| | | |
|---|---|---|
| CN | 105378867 B | 4/2018 |
| JP | 2012209539 A | 10/2012 |
| JP | 2013165178 A | 8/2013 |
| JP | 2019016688 A | 1/2019 |

OTHER PUBLICATIONS

A Notice of Reasons for Refusal issued by the Japanese Patent Office, dated Jan. 24, 2023, for Japanese counterpart application No. 2019-043611. (3 pages).

\* cited by examiner

MULTI-LAYER CERAMIC ELECTRONIC COMPONENT AND METHOD OF PRODUCING THE SAME

BACKGROUND ART

The present disclosure relates to a multi-layer ceramic electronic component including side margins provided in a later step, and a method of producing the multi-layer ceramic electronic component.

In the process of producing a multi-layer ceramic capacitor, a technique of providing side margins thereto in a later step is known (see, for example, Japanese Patent Application Laid-open No. 2012-209539). This technique can suppress an error in intersectional area of internal electrodes due to a positional displacement of the patterning for the internal electrodes and thus allows variations in capacitance of the multi-layer ceramic capacitor to be kept small.

As an example, in the method of producing a multi-layer ceramic capacitor, which is disclosed in Japanese Patent Application Laid-open No. 2012-209539, a multi-layer sheet, which includes laminated ceramic sheets on which respective internal electrodes are printed, is cut to produce a plurality of multi-layer units. The multi-layer units each have side surfaces, i.e., cross sections from which the internal electrodes are exposed. Subsequently, another ceramic sheet is punched by using the side surface of the multi-layer unit to thus form a side margin on the side surface of the multi-layer unit.

SUMMARY OF THE INVENTION

However, in the technique of providing the side margins to the side surfaces of the multi-layer unit in a later step, the side margins are easily peeled from the side surfaces of the multi-layer unit while the multi-layer unit including the side margins provided to the side surfaces is sintered. Thus, in the multi-layer ceramic capacitor, moisture enters the side surfaces of the multi-layer unit, from which the internal electrodes are exposed, and an insulation failure is likely to occur accordingly.

In view of the circumstances as described above, it is desirable to provide a multi-layer ceramic electronic component and a method of producing the multi-layer ceramic electronic component, which are less likely to cause the peeling of a side margin.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one aspect, the present disclosure provides a multi-layer ceramic electronic component including a multi-layer unit and a side margin.

The multi-layer unit includes a functional unit including internal electrodes laminated in a first direction, and a pair of covers that covers the functional unit from both sides in the first direction, the multi-layer unit satisfying a relationship of $(2*t2)/t1 \geq 0.6$, where $t1$ represents a dimension of the functional unit in the first direction and $t2$ represents a dimension of each of the pair of covers in the first direction.

The side margin covers the multi-layer unit in a second direction orthogonal to the first direction.

In the process of producing the multi-layer ceramic electronic component, the multi-layer unit during sintering has different shrinkage behaviors between the functional unit including the internal electrodes and the cover including no internal electrodes. In such a multi-layer unit during sintering, due to the mismatching in shrinkage behavior between the functional unit and the cover, the side margin is likely to be peeled from the side surface of the multi-layer unit.

In this regard, the above-mentioned configuration includes the thick covers and thus has a high stiffness. Thus, in this configuration, the covers that sandwich the functional unit therebetween and have a high stiffness hinder the functional unit from shrinking in a behavior different from the behavior of the covers. In this configuration, the mismatching in shrinkage behavior between the functional unit and the cover in the multi-layer unit is mitigated.

Therefore, in the multi-layer ceramic electronic component thus configured, the side margin can be prevented from being peeled from the side surface of the multi-layer unit. In the multi-layer ceramic electronic component thus configured, the occurrence of an insulation failure, which results from the moisture that enters the side surface of the multi-layer unit, from which the internal electrodes are exposed, can be suppressed, thus providing high reliability.

The multi-layer ceramic electronic component may have a thickness dimension in the first direction, a dimension in the second direction, and a dimension in a third direction orthogonal to the first direction and the second direction, and the thickness dimension may be smaller than a lateral dimension, the lateral dimension being a smaller dimension of the dimension in the second direction and the dimension in the third direction.

The thickness dimension may be equal to or smaller than a half of the lateral dimension.

The thickness dimension may be equal to or smaller than a quarter of the lateral dimension.

In such a low-profile multi-layer ceramic electronic component, the peeling of the side margin is more likely to occur, and thus the configuration according to the aspect of the present disclosure is particularly effective.

End portions of the internal electrodes in the second direction may be positioned within a range of 0.5 μm in the second direction.

In this configuration, variations in performance of the internal electrodes due to the positional displacement can be kept small. In particular, in the case of the multi-layer ceramic capacitor, an error in intersectional area of the internal electrodes is less likely to occur, and thus the variations in capacitance can be kept small.

In another aspect, the present disclosure provides a method of producing a multi-layer ceramic electronic component, the method including: preparing an unsintered multi-layer unit including a functional unit including internal electrodes laminated in a first direction, and a pair of covers that covers the functional unit from both sides in the first direction, the unsintered multi-layer unit satisfying a relationship of $(2*t2)/t1 \geq 0.6$ after sintering, where $t1$ represents a dimension of the functional unit in the first direction and $t2$ represents a dimension of each of the pair of covers in the first direction; producing an unsintered ceramic body by forming an unsintered side margin that covers the unsintered multi-layer unit in a second direction orthogonal to the first direction; and sintering the unsintered ceramic body.

The unsintered side margin may be formed by attaching a ceramic sheet to the unsintered multi-layer unit.

The unsintered side margin may be formed by punching the ceramic sheet by using the unsintered multi-layer unit.

As described above, according to the present disclosure, it is possible to provide a multi-layer ceramic electronic component and a method of producing the multi-layer ceramic electronic component, which are less likely to cause the peeling of a side margin.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, an embodiment of the present disclosure will be described with reference to the drawings.

In the figures, an X axis, a Y axis, and a Z axis orthogonal to one another are shown as appropriate. The Z axis is an axis facing in the vertical direction. The X axis and the Y axis are axes facing in the horizontal direction orthogonal to the Z axis. The X axis, the Y axis, and the Z axis are common in all figures.

1. Configuration of Multi-Layer Ceramic Capacitor 10

Figure 1:
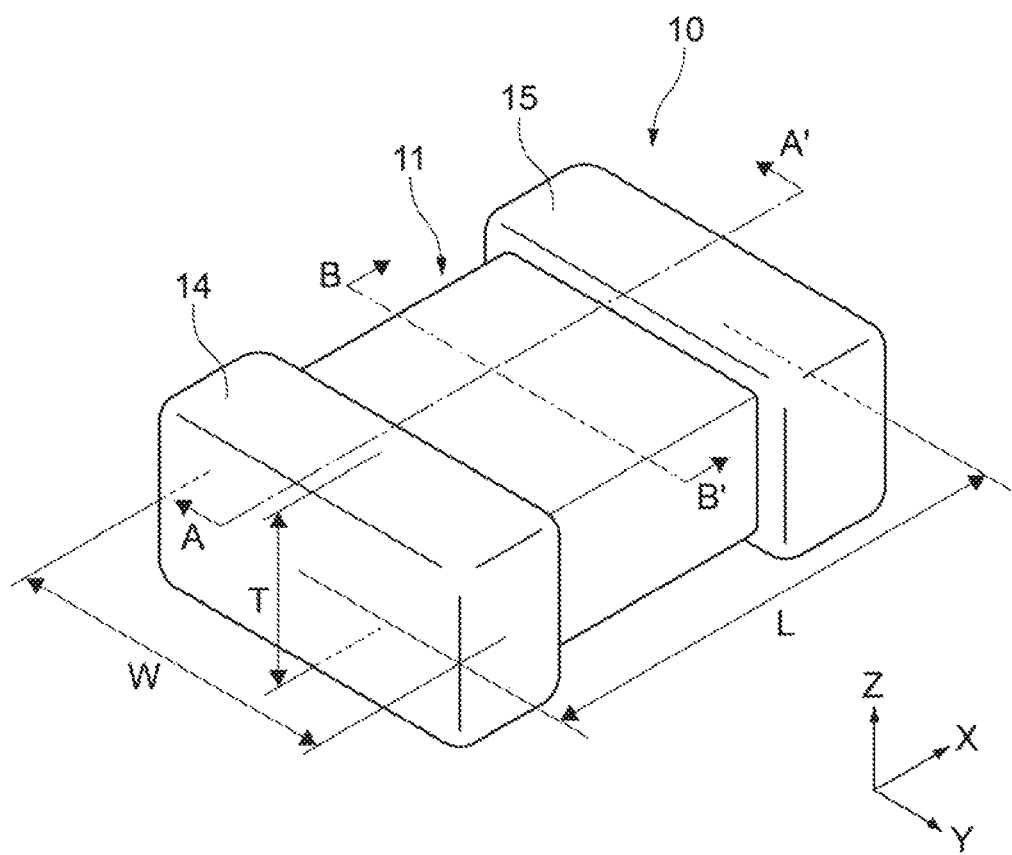
FIG. 1 is a perspective view of a multi-layer ceramic capacitor according to an embodiment of the present disclosure.
Figure 2:
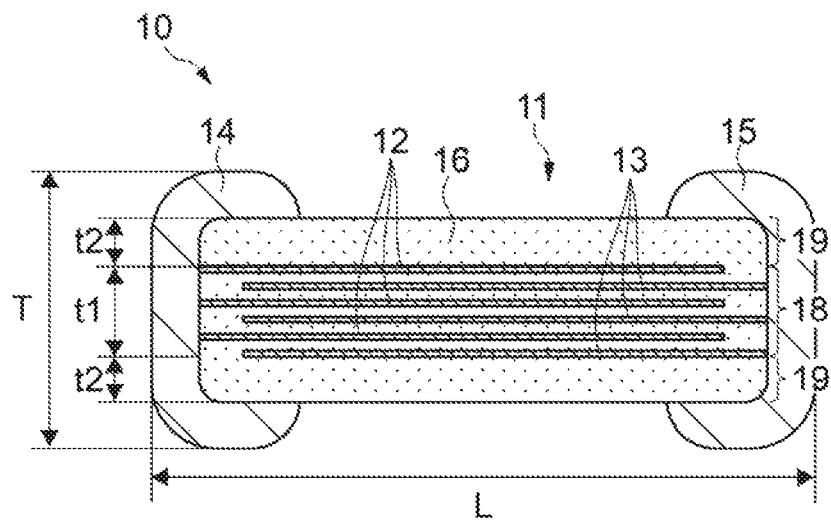
FIG. 2 is a cross-sectional view of the multi-layer ceramic capacitor taken along the A-A' line in FIG. 1.
Figure 3:
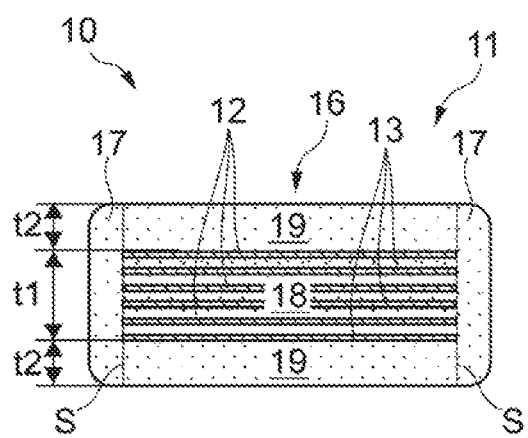
FIG. 3 is a cross-sectional view of the multi-layer ceramic capacitor taken along the B-B' line in FIG. 1.

FIGS. 1 to 3 each show a multi-layer ceramic capacitor 10 having a common posture according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

FIGS. 1 and 2 show a longitudinal dimension L in the X-axis direction, a lateral dimension W in the Y-axis direction, and a thickness dimension T in the Z-axis direction of the multi-layer ceramic capacitor 10. In the multi-layer ceramic capacitor 10, a maximum dimension in the X-axis direction is the longitudinal dimension L, a maximum dimension in the Y-axis direction is the lateral dimension W, and a maximum dimension in the Z-axis direction is the thickness dimension T.

The multi-layer ceramic capacitor 10 is configured to have a low-profile shape, which is thin in the Z-axis direction. In other words, in the multi-layer ceramic capacitor 10, the longitudinal dimension L is larger than the lateral dimension W, and the thickness dimension T is smaller than the lateral dimension W. The low-profile multi-layer ceramic capacitor 10 is advantageous particularly in a use application of being mounted on a thin electronic component.

The multi-layer ceramic capacitor 10 includes a ceramic body 11, a first external electrode 14, and a second external electrode 15. The ceramic body 11 is configured as a hexahedron having a pair of end surfaces facing in the X-axis direction, a pair of side surfaces facing in the Y-axis direction, and a pair of main surfaces facing in the Z-axis direction.

The first external electrode 14 and the second external electrode 15 cover both the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, the first external electrode 14 and the second external electrode 15 have U-shaped cross sections parallel to the X-Z plane and the X-Y plane.

It should be noted that the shapes of the first and second external electrodes 14 and 15 are not limited to those shown in FIG. 1. For example, the first and second external electrodes 14 and 15 may extend to one of the main surfaces from both the end surfaces of the ceramic body 11 and have L-shaped cross sections parallel to the X-Z plane. This configuration allows the thickness dimension T in the Z-axis direction to be kept smaller in the multi-layer ceramic capacitor 10.

The first and second external electrodes 14 and 15 are each formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like or an alloy of them.

The ceramic body 11 is formed of dielectric ceramics and includes a multi-layer unit 16 and side margins 17. The multi-layer unit 16 has a pair of side surfaces S that face in the Y-axis direction. Further, the multi-layer unit 16 has a pair of end surfaces that partially constitute the end surfaces of the ceramic body 11, and a pair of main surfaces that partially constitute the main surfaces of the ceramic body 11.

The multi-layer unit 16 has a configuration in which a plurality of sheet-like ceramic layers extending along the X-Y plane are laminated in the Z-axis direction. The multi-layer unit 16 includes a capacitance forming unit 18 and a pair of covers 19. The capacitance forming unit 18 is configured as a functional unit that forms a capacitance. The pair of covers 19 covers the capacitance forming unit 18 from above and below in the Z-axis direction. The pair of covers 19 constitutes the pair of main surfaces of the multi-layer unit 16.

The capacitance forming unit 18 includes a plurality of first internal electrodes 12 and a plurality of second internal electrodes 13 that are disposed between the ceramic layers. The first and second internal electrodes 12 and 13 each have a sheet-like shape extending along the X-Y plane. The first and second internal electrodes 12 and 13 are alternately disposed along the Z-axis direction. In other words, the first internal electrode 12 and the second internal electrode 13 that are adjacent to each other face each other in the Z-axis direction while sandwiching the ceramic layer therebetween.

The first internal electrodes 12 are drawn to the end surface covered with the first external electrode 14. Meanwhile, the second internal electrodes 13 are drawn to the end surface covered with the second external electrode 15. With this configuration, the first internal electrodes 12 are connected to only the first external electrode 14, and the second internal electrodes 13 are connected to only the second external electrode 15.

The first and second internal electrodes 12 and 13 are formed over the entire width of the capacitance forming unit 18 in the Y-axis direction and are exposed from the pair of side surfaces S of the multi-layer unit 16. The side margins 17 cover the pair of side surfaces S of the multi-layer unit 16. This can ensure insulation properties between the first internal electrodes 12 and the second internal electrodes 13 on both the side surfaces S of the multi-layer unit 16.

With such a configuration, when a voltage is applied between the first external electrode 14 and the second external electrode 15 in the multi-layer ceramic capacitor 10, the voltage is applied to the ceramic layers between the first internal electrodes 12 and the second internal electrodes 13. This allows the multi-layer ceramic capacitor 10 to store charge corresponding to the voltage applied between the first external electrode 14 and the second external electrode 15.

In the ceramic body 11, in order to increase capacitances of the respective ceramic layers provided between the first internal electrodes 12 and the second internal electrodes 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

It should be noted that the ceramic layer may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal mainly containing copper (Cu), palladium (Pd), platinum (Pt), silver (Ag), gold (Au), or the like or an alloy of them.

In the multi-layer ceramic capacitor 10, the side margins 17 are provided to the side surfaces S of the multi-layer unit 16 in a later step in a stage before sintering, the details of which will be described later. Thus, in the multi-layer ceramic capacitor 10, the positions of the end portions of the first and second internal electrodes 12 and 13 in the Y-axis direction of the ceramic body 11 fall within the range of 0.5 μm in the Y-axis direction.

With this configuration, an error in intersectional area of the first and second internal electrodes 12 and 13 of the capacitance forming unit 18 is less likely to occur in the multi-layer ceramic capacitor 10, and thus variations in capacitance can be kept small. Further, the side margins 17 are thinned, thus achieving the miniaturization and increase in capacitance of the multi-layer ceramic capacitor 10.

Further, FIGS. 2 and 3 show the multi-layer unit 16 having a thickness dimension t1 of the capacitance forming unit 18 in the Z-axis direction and a thickness dimension t2 of each cover 19 in the Z-axis direction. The multi-layer ceramic capacitor 10 is configured such that the capacitance forming unit 18 and the covers 19 of the multi-layer unit 16 satisfy a relationship of $(2*t2)/t1 \geq 0.6$.

In other words, in the multi-layer ceramic capacitor 10, the covers 19 are formed to be thick such that the total dimension 2*t2 of the pair of covers 19 in the Z-axis direction is 60% or more of the thickness dimension t1 of the capacitance forming unit 18. It is favorable that the thickness dimensions t2 of the paired covers 19 are substantially the same, but may be different from each other.

As described above, in the multi-layer unit 16 of the multi-layer ceramic capacitor 10, the capacitance forming unit 18 is sandwiched between the covers 19 each having the large thickness dimension t2 and a high stiffness. Thus, the capacitance forming unit 18 is difficult to exert a shrinkage behavior different from the shrinkage behavior of the covers 19 in the multi-layer unit 16 during sintering. Thus, the stress to be applied from the side surfaces S to the side margins 17 is suppressed.

Therefore, in the multi-layer ceramic capacitor 10, the side margins 17 are less likely to be peeled from the side surfaces S of the multi-layer unit 16 during sintering. This can suppress, in the multi-layer ceramic capacitor 10, the generation of an insulation failure between the first and second internal electrodes 12 and 13 due to the moisture entering the side surfaces S of the multi-layer unit 16, the first and second internal electrodes 12 and 13 being exposed from the side surfaces S.

2. Method of Producing Multi-Layer Ceramic Capacitor 10

Figure 4:
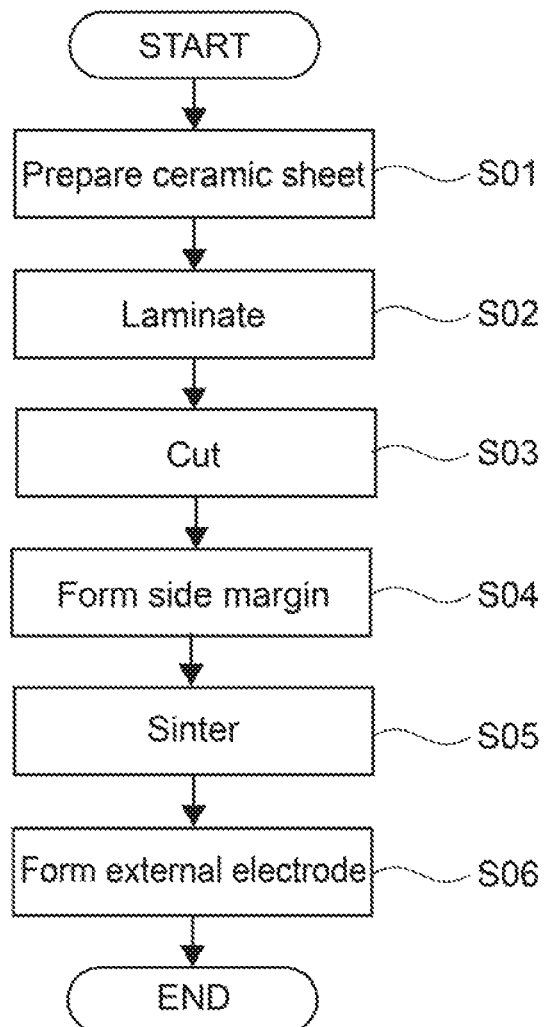
FIG. 4 is a flowchart showing a method of producing the multi-layer ceramic capacitor.
Figure 5:
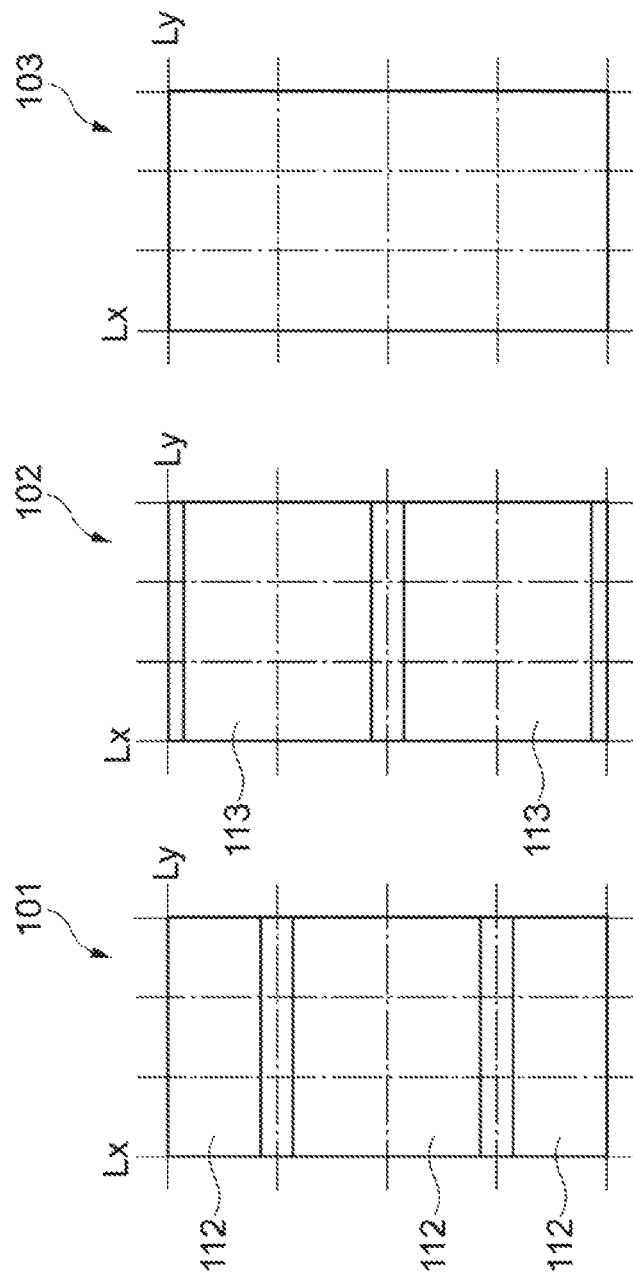
FIGS. 5A, 5B, and 5C are plan views of ceramic sheets, which are prepared in a process of preparing ceramic sheets of the production method described above.

FIG. 4 is a flowchart showing a method of producing the multi-layer ceramic capacitor 10 according to this embodiment. FIGS. 5A to 10C are views each showing a production process of the multi-layer ceramic capacitor 10. Hereinafter, the method of producing the multi-layer ceramic capacitor 10 will be described along FIG. 4 with reference to FIGS. 5A to 10C as appropriate.

2.1 Step S01: Preparation of Ceramic Sheet

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are configured as unsintered dielectric green sheets mainly containing dielectric ceramics.

The first, second, and third ceramic sheets 101, 102, and 103 are each formed into a sheet shape by using a roll coater or a doctor blade, for example. The thickness of each of the first and second ceramic sheets 101 and 102 is adjusted in accordance with the thickness of the ceramic layer of the sintered capacitance forming unit 18. The thickness of the third ceramic sheet 103 is adjustable as appropriate.

FIGS. 5A, 5B, and 5C are plan views of the first, second, and third ceramic sheets 101, 102, and 103, respectively. At this stage, the first, second, and third ceramic sheets 101, 102, and 103 are each configured as a large-sized sheet that is not singulated. FIGS. 5A, 5B, and 5C each show cutting lines Lx and Ly used when the sheets are singulated into the multi-layer ceramic capacitors 10. The cutting lines Lx are parallel to the X axis, and the cutting lines Ly are parallel to the Y axis.

As shown in FIGS. 5A, 5B, and 5C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first internal electrodes 112 and the second internal electrodes 113 can be formed by applying an optional electrically conductive paste to the first ceramic sheets 101 and the second ceramic sheets 102, respectively. The method of applying the electrically conductive paste is optionally selectable from publicly known techniques. For example, for the application of the electrically conductive paste, a screen printing method or a gravure printing method can be used.

In the first and second internal electrodes 112 and 113, gaps are formed in the X-axis direction along the cutting lines Ly for every other cutting line Ly. The gaps between the first internal electrodes 112 and the gaps between the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

2.2 Step S02: Lamination

Figure 6:
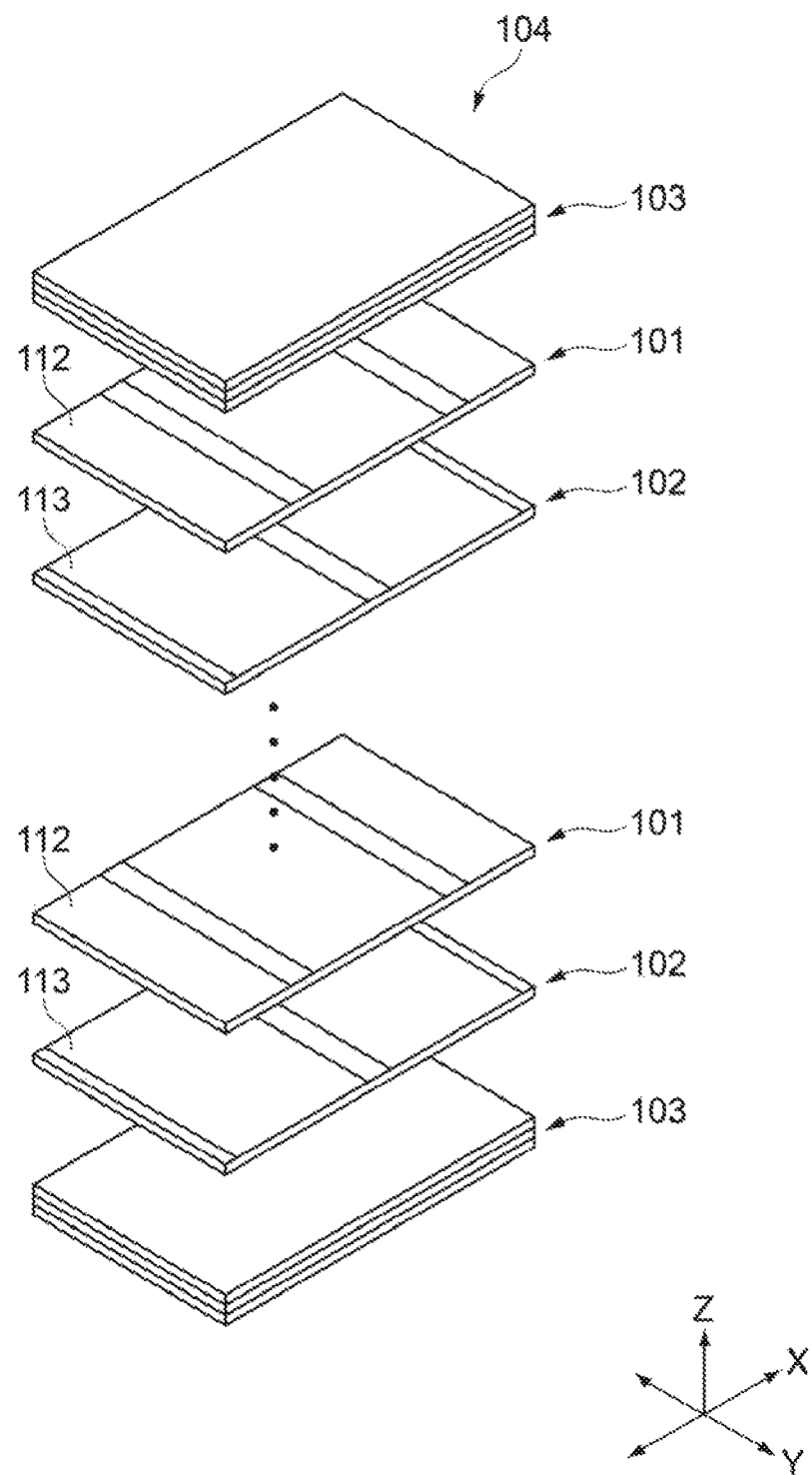
FIG. 6 is a perspective view showing a lamination process of the production method described above.

In Step S02, the first, second, and third ceramic sheets 101, 102, and 103 prepared in Step S01 are laminated as shown in FIG. 6, to produce a multi-layer sheet 104. In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the upper and lower surfaces of the alternately laminated first and second ceramic sheets 101 and 102 in the Z-axis direction. The number of first, second, and third ceramic sheets 101, 102, and 103 to be laminated can be determined in accordance with the configuration of the multi-layer ceramic capacitor 10.

In particular, the thickness dimension t1 of the capacitance forming unit 18 is adjustable by the thickness of each of the first and second ceramic sheets 101 and 102 and the number of first and second ceramic sheets 101 and 102 to be laminated. Further, the thickness dimension t2 of each of the paired covers 19 is adjustable by the thickness of the third ceramic sheet 103 and the number of third ceramic sheets 103 to be laminated.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 104.

2.3 Step S03: Cutting

In Step S03, the multi-layer sheet 104 obtained in Step S02 is cut along the cutting lines Lx and Ly, to produce unsintered multi-layer units 116. Each of the multi-layer units 116 corresponds to a multi-layer unit 16 to be obtained after sintering. The multi-layer sheet 104 can be cut with a push-cutting blade, a rotary blade, or the like.

Figure 7:
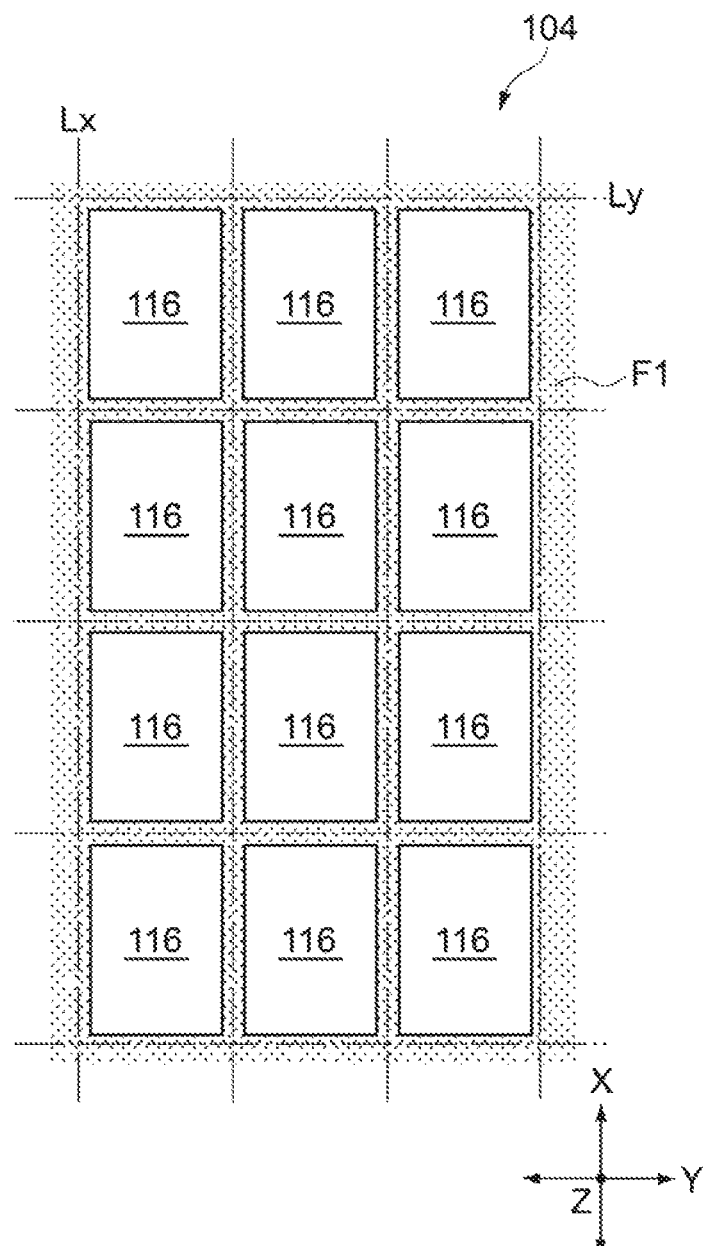
FIG. 7 is a plan view showing a cutting process of the production method described above.

FIG. 7 is a plan view of the multi-layer sheet 104 after Step S03. The multi-layer sheet 104 is cut along the cutting lines Lx and Ly while the multi-layer sheet 104 is held by an adhesive sheet F1 such as a foamed release sheet. The multi-layer sheet 104 is cut into pieces in such a manner, and thus the multi-layer units 116 are obtained.

Figure 8:
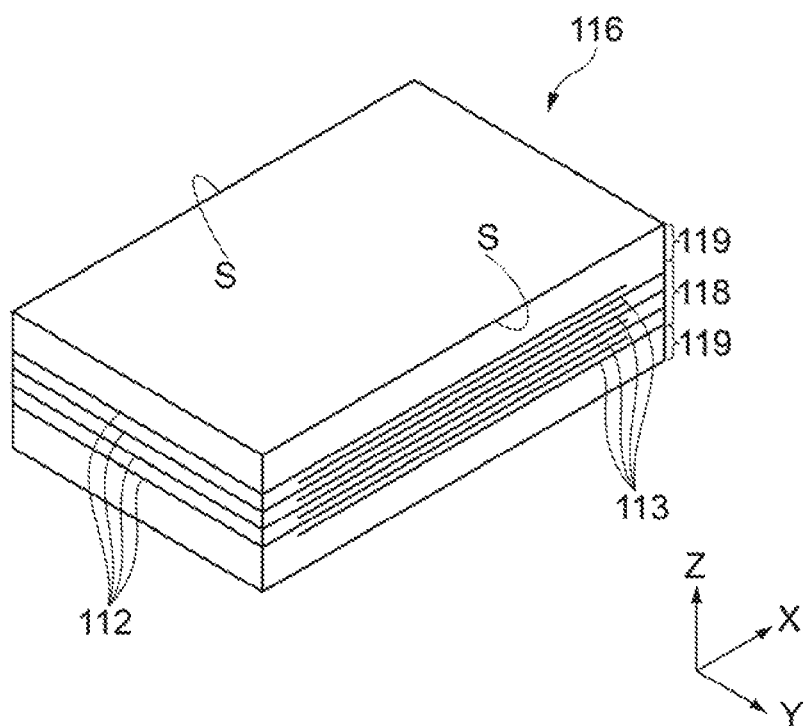
FIG. 8 is a perspective view of a multi-layer unit obtained in the cutting process.

FIG. 8 is a perspective view of the unsintered multi-layer unit 116 obtained in Step S03. The multi-layer unit 116 includes an unsintered capacitance forming unit 118 and unsintered covers 119. Further, in the multi-layer unit 116, the first and second internal electrodes 112 and 113 are exposed from the cut surfaces, i.e., the side surfaces S, and the end portions of the first and second internal electrodes 112 and 113 in the Y-axis direction are aligned with one another on the side surfaces S.

2.4 Step S04: Formation of Side Margin

Figure 9:
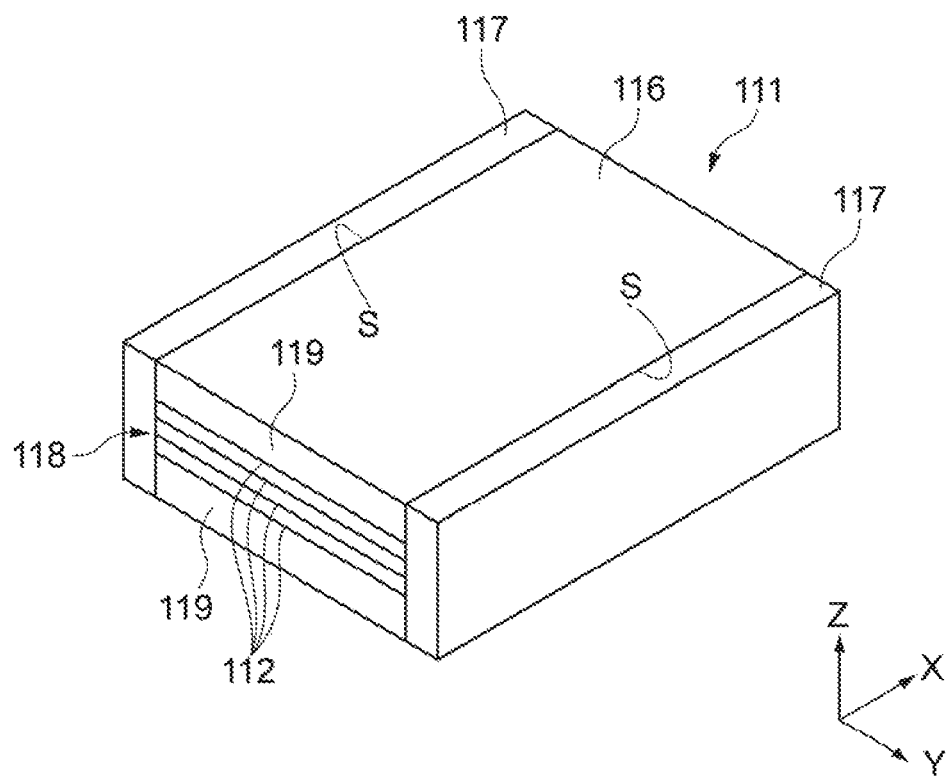
FIG. 9 is a perspective view of an unsintered ceramic body obtained in the process of forming side margins of the production method described above.

In Step S04, unsintered side margins 117 are provided to both the side surfaces S of the multi-layer unit 116 obtained in Step S03. With this configuration, an unsintered ceramic body 111 shown in FIG. 9 is obtained. The side margins 117 can be formed by, for example, attaching a ceramic sheet 117s to each of the side surfaces S of the multi-layer unit 116.

In order to attach the ceramic sheet 117s to the side surface S of the multi-layer unit 116, for example, a punching method can be used. In other words, when the ceramic sheet 117s is punched by the side surface S of the multi-layer unit 116, the ceramic sheet 117s can be cut along the outline of the side surface S and simultaneously bonded to the side surface S.

Figure 10A:
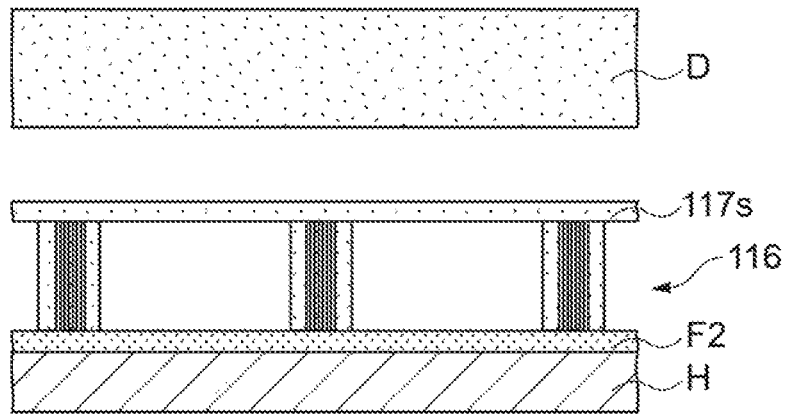
FIGS. 10A, 10B, and 10C are partial cross-sectional views each showing the process of forming side margins.
Figure 10B:
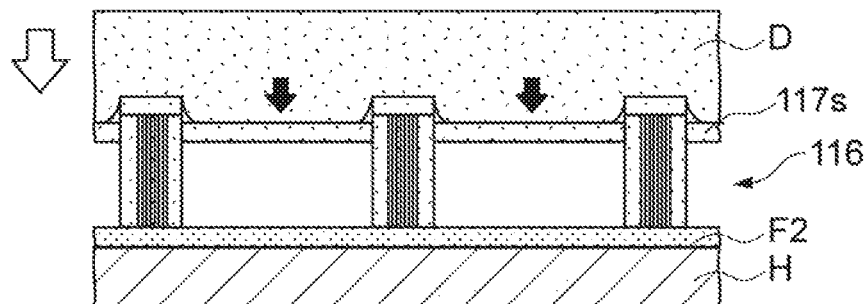
Figure 10C:
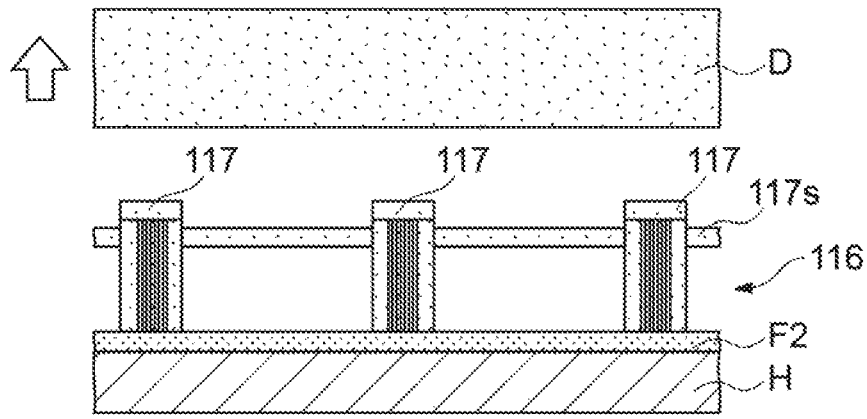

FIGS. 10A, 10B, and 10C are cross-sectional views each showing a process of forming the side margins 117 by the punching method. The method shown in FIGS. 10A, 10B, and 10C enables the side margins 117 to be formed in a lump on the side surfaces S of a plurality of multi-layer units 116 by simultaneously punching the ceramic sheet 117s by the side surfaces S of the respective multi-layer units 116.

First, as shown in FIG. 10A, the plurality of multi-layer units 116, one side surface S of each of which is directed upward, are arranged on an adhesive sheet F2 that holds the other side surface S of each of the multi-layer units 116. Next, the lower surface of the adhesive sheet F2 is held by a flat plate-like holding member H, and a ceramic sheet 117s is disposed on the side surfaces S of the plurality of multi-layer units 116, the side surfaces S facing upward.

Further, a flat plate-like elastic member D formed of an elastic body is caused to face the upper surface of the ceramic sheet 117s covering the plurality of multi-layer units 116. Subsequently, as shown in FIG. 10B, the elastic member D is moved downward until it comes into contact with the ceramic sheet 117s. Further, the ceramic sheet 117s is pushed downward by the elastic member D.

In this case, the elastic member D bites into spaces formed between the multi-layer units 116 and thus pushes downward the regions of the ceramic sheet 117s, which are not held by the side surfaces S of the multi-layer units 116. In such a manner, the ceramic sheet 117s is cut by a shear force, which is applied in the vertical direction, along the outer edge of the side surface S of each multi-layer unit 116.

Subsequently, as shown in FIG. 10C, the elastic member D is moved upward and thus separated from the ceramic sheet 117s. In this case, the ceramic sheet 117s left on the side surface S of each multi-layer unit 116 is the side margin 117. The ceramic sheet 117s left in the spaces between the multi-layer units 116 is removed.

Subsequently, the plurality of multi-layer units 116 held by the adhesive sheet F2 are transferred to an another sheet, and thus the directions of the multi-layer units 116 are inverted vertically. This allows the side margins 117 to be collectively formed also on the other side surface S of each of the multi-layer units 116, in the manner similar to the above.

It should be noted that the method of attaching the ceramic sheet 117s to the side surface S of the multi-layer unit 116 is not necessarily the punching method. For example, the side margins 117 can also be formed by attaching the ceramic sheets 117s, which are cut along the outline of the side surface S of the multi-layer unit 116, to both the side surfaces S of the multi-layer unit 116.

Further, the ceramic sheet 117s is not necessarily used to form the side margin 117. For example, ceramic slurry may be used. In other words, the side margin 117 can also be formed by immersing the side surface S of the multi-layer unit 116 into the ceramic slurry and causing the ceramic slurry to adhere to the side surface S of the multi-layer unit 116.

2.5 Step S05: Sintering

In Step S05, the ceramic body 111 shown in FIG. 9, which is obtained in Step S04, is sintered to produce the ceramic body 11 of the multi-layer ceramic capacitor 10 shown in FIGS. 1 to 3. In other words, through Step S05, the multi-layer unit 116 becomes the multi-layer unit 16, and the side margins 117 become the side margins 17.

A sintering temperature in Step S05 can be determined on the basis of a sintering temperature for the ceramic body 111. For example, if a barium titanate (BaTiO$_3$) based material is used, the sintering temperature can be set to approximately 1,000 to 1,300° C. Further, sintering can be performed in a reduction atmosphere or a low-oxygen partial pressure atmosphere, for example.

In the multi-layer unit 116, the capacitance forming unit 118 including the first and second internal electrodes 112 and 113 has higher sinterability than the sinterability of the covers 119 including no first and second internal electrodes 112 and 113. Thus, in the multi-layer unit 116 during sintering, the capacitance forming unit 118 starts to shrink earlier than the covers 119 and is expected to have a larger shrinkage than that of the covers 119.

However, since the capacitance forming unit 118 is sandwiched between the covers 119 having a high stiffness, the timing of shrinkage and the amount of shrinkage are regulated by the covers 119. In other words, in the multi-layer unit 116 during sintering, the covers 119 hinder the capacitance forming unit 118 from shrinking in a behavior different from the behavior of the covers 119.

Thus, in the multi-layer unit 116 during sintering, the capacitance forming unit 118 and the covers 119 shrink in a similar behavior, that is, the mismatching in shrinkage behavior between the capacitance forming unit 118 and the covers 119 is less likely to occur. With this configuration, the stress to be applied from the side surfaces S of the multi-layer unit 116 to the side margins 117 is suppressed.

Therefore, in the multi-layer unit 116 during sintering, the side margins 117 can be prevented from being peeled from the side surfaces S of the multi-layer unit 116. With this configuration, in the multi-layer ceramic capacitor 10, gaps are less likely to be generated between the multi-layer unit 16 and the side margin 17 also after sintering, and thus high moisture resistance is obtained.

Figure 11:
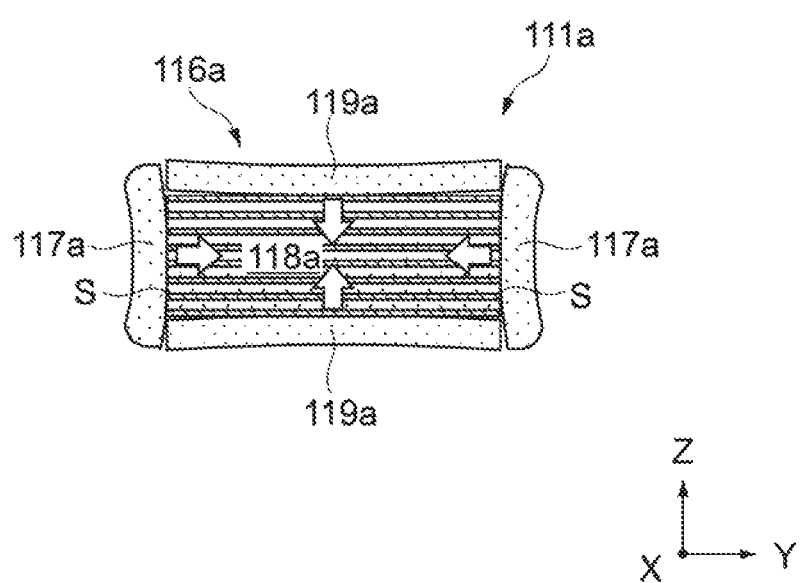
FIG. 11 is a cross-sectional view schematically showing a process of sintering a ceramic body having a general configuration.

FIG. 11 is a cross-sectional view schematically showing the process of sintering a general ceramic body 111a. In order to advantageously achieve the large capacitance and miniaturization, a multi-layer unit 116a of the ceramic body 111a has a configuration in which a thickness dimension t1 of a capacitance forming unit 118a is large and a thickness dimension t2 of a cover 119a is small.

In other words, in the ceramic body 111a, the percentage of the covers 119a in the multi-layer unit 116a is smaller than the percentage of the covers 119 in the multi-layer unit 116 according to this embodiment. Thus, the stiffness of the covers 119a of the ceramic body 111a is lower than the stiffness of the covers 119 of the ceramic body 111 according to this embodiment.

Therefore, in the ceramic body 111a, the shrinkage behavior of the capacitance forming unit 118a is difficult to be regulated by the covers 119a. Thus, in the multi-layer unit 116a during sintering, the capacitance forming unit 118a starts to shrink earlier than the covers 119a and shrinks to a larger extent than the covers 119a.

With this configuration, as shown in FIG. 11, in the side margin 117a, while both end portions in the Z-axis direction are regulated by the covers 119a from the inner side in the Y-axis direction, the center portion in the Z-axis direction is pulled inward in the Y-axis direction by the capacitance forming unit 118a. This makes it easy to peel the side margins 117a from the side surfaces S of the multi-layer unit 116a.

Similarly, in the multi-layer unit 116a during sintering, the capacitance forming unit 118a shrinks to a larger extent in the Z-axis direction than the side margins 117a, and the covers 119a are easily peeled from the capacitance forming unit 118a. To the contrary, in the multi-layer ceramic capacitor 10 according to this embodiment, the peeling of the side margins 117 and the covers 119 is less likely to occur.

The peeling of the side margins 117 during sintering is more likely to occur in the multi-layer ceramic capacitor 10 having a smaller thickness dimension T, that is, a smaller dimension of the side surface S of the multi-layer unit 116 in the Z-axis direction. Thus, the configuration according to the embodiment of the present disclosure is more effective for the multi-layer ceramic capacitor 10 having a smaller thickness dimension T.

In other words, according to the present disclosure, the technique of providing the side margins 117 in a later step is applicable to the multi-layer ceramic capacitor 10 having a lower height. Specifically, the present disclosure is more effective for the configuration in which the thickness dimension T is equal to or smaller than a half of the lateral dimension W, and even more effective for the configuration in which the thickness dimension T is equal to or smaller than a quarter of the lateral dimension W.

Further, in the multi-layer unit 116 during sintering, the amount of shrinkage of the capacitance forming unit 118 along the X-Y plane is kept small, and thus the amount of change in intersectional area of the first and second internal electrodes 112 and 113 is reduced. With this configuration, in the multi-layer ceramic capacitor 10, an error in intersectional area of the first and second internal electrodes 12 and 13 is less likely to occur, and variations in capacitance can thus be more effectively suppressed.

2.6 Step S06: Formation of External Electrode

In Step S06, the first external electrode 14 and the second external electrode 15 are formed on both the end portions of the ceramic body 11 in the X-axis direction obtained in Step S05, to complete the multi-layer ceramic capacitor 10 shown in FIGS. 1 to 3. The method of forming the first external electrode 14 and the second external electrode 15 in Step S06 is optionally selectable from publicly known methods.

3. Example and Comparative Example

For Example and Comparative example for the multi-layer ceramic capacitor 10, 1,000 samples for each of the configurations 1 to 12, in which the dimensions L, W, T, t1, and t2 are different, were produced. In the configurations 1 to 12 of the respective samples, the dimensions L, W, T, t1, and t2 were set as shown in Table 1, and the other configurations were set to be common.

A moisture resistance test was performed for the samples of the configurations 1 to 12. In the moisture resistance test, the samples were held for 1,000 hours at a temperature of 45° C. and a humidity of 95% under application of a rated voltage of 10 V. Subsequently, the samples whose electric resistance value was smaller than 10 MS2 after the moisture resistance test were determined as defectives due to an insulation failure.

Table 1 shows the number of samples determined as defectives in the 1,000 samples, as the evaluation results of the moisture resistance test for each of the configurations 1 to 12. Further, Table1 shows the value of (2*t2)/t1 calculated from the thickness dimension t1 of the capacitance forming unit 18 and the thickness dimension t2 of the cover 19 for each of the configurations 1 to 12.

TABLE 1

| Configuration | L (mm) | W (mm) | T (mm) | t1 (mm) | t2 (mm) | (2 × t2)/t1 | Number of defectives (pieces) |
|---|---|---|---|---|---|---|---|
| 1 | 1.00 | 0.50 | 0.50 | 0.40 | 0.02 | 0.10 | 5 |
| 2 | | | 0.11 | 0.03 | 0.02 | 1.33 | 0 |
| 3 | | | 0.09 | 0.01 | 0.02 | 4.00 | 0 |
| 4 | | | 0.06 | 0.03 | 0.01 | 0.67 | 0 |
| 5 | 0.60 | 0.30 | 0.30 | 0.20 | 0.02 | 0.20 | 3 |
| 6 | | | 0.11 | 0.03 | 0.02 | 1.33 | 0 |
| 7 | | | 0.09 | 0.01 | 0.02 | 4.00 | 0 |
| 8 | | | 0.06 | 0.03 | 0.01 | 0.67 | 0 |
| 9 | 0.50 | 0.20 | 0.20 | 0.10 | 0.02 | 0.40 | 2 |
| 10 | | | 0.11 | 0.03 | 0.02 | 1.33 | 0 |
| 11 | | | 0.09 | 0.01 | 0.02 | 4.00 | 0 |
| 12 | | | 0.06 | 0.03 | 0.01 | 0.67 | 0 |

As shown in Table 1, in the configurations 2, 3, 4, 6, 7, 8, 10, 11, and 12 according to Example in which the value of (2*t2)/t1 is 0.6 or more, no defectives are found in any sample. On the other hand, in the configurations 1, 5, and 9 according to Comparative example in which the value of (2*t2)/t1 is less than 0.6, the occurrence of defectives was determined in a plurality of samples in each of the configurations.

4. Other Embodiments

While the embodiment of the present disclosure has been described, the present disclosure is not limited to the embodiment described above, and it should be appreciated that the present disclosure may be variously modified.

For example, in the multi-layer ceramic capacitor 10, the first and second external electrodes 14 and 15 may be provided to not both end portions in the direction of the longitudinal dimension L but both end portions in the direction of the lateral dimension W. In this case, in the multi-layer unit 16, the first and second internal electrodes 12 and 13 are drawn to the side surfaces, which are to be covered with the first and second external electrodes 14 and 15, and the side margins 17 are provided to the end surfaces, from which the first and second internal electrodes 12 and 13 are exposed.

Further, the multi-layer ceramic capacitor 10, to which an embodiment of the present disclosure is applicable, is not limited to have a low-profile configuration in which the thickness dimension T is smaller than the lateral dimension W. In the multi-layer ceramic capacitor 10, the effect of the present disclosure, by which the side margins 17 are less likely to be peeled, is obtained also in the configuration in which the thickness dimension T is equal to or larger than the lateral dimension W.

Moreover, the present disclosure is applicable to not only the multi-layer ceramic capacitor but also a general multi-layer ceramic electronic component including a functional unit in which a plurality of internal electrodes are laminated. Example of the multi-layer ceramic electronic component to which the present disclosure is applicable include a chip varistor, a chip thermistor, and a multi-layer inductor, in addition to the multi-layer ceramic capacitor.

In addition, in the multi-layer ceramic capacitor 10, at least one of manganese (Mn) or magnesium (Mg) may be added to the ceramic body 11. In this case, when the amount of at least one of Mn or Mg to be added in the side margins 17 is set to be larger than that in the capacitance forming unit 18, the side margins 17 can be effectively prevented from being peeled without hindering the function of the capacitance forming unit 18. Similarly, when the amount of at least one of Mn or Mg to be added in the covers 19 is set to be larger than that in the capacitance forming unit 18, the covers 19 can be effectively prevented from being peeled without hindering the function of the capacitance forming unit 18.

It will be apparent to those skilled in the art that various modifications and variations can be made in the present disclosure without departing from the spirit or scope of the disclosure. Thus, it is intended that the present disclosure cover modifications and variations that come within the scope of the appended claims and their equivalents. In particular, it is explicitly contemplated that any part or whole of any two or more of the embodiments and their modifications described above can be combined and regarded within the scope of the present disclosure.

What is claimed is:

1. A multi-layer ceramic electronic component, comprising:
   a multi-layer unit including
      a functional unit including internal electrodes laminated in a first direction, and
      a pair of covers that covers the functional unit from both sides in the first direction,
      the multi-layer unit satisfying a relationship of $(2*t2)/t1 \geq 0.6$, where t1 represents
   a dimension of the functional unit in the first direction and t2 represents a dimension of each of the pair of covers in the first direction; and
   a side margin that covers the multi-layer unit in a second direction orthogonal to the first direction,
   wherein the multi-layer ceramic electronic component has a thickness dimension (T) in the first direction, a dimension (W) in the second direction, and a dimension (L) in a third direction orthogonal to the first direction and the second direction, wherein the thickness dimension (T) is equal to or smaller than a half of a lateral dimension (LD) which is the dimension (W) in the second direction or the dimension (L) in the third direction, whichever is smaller, or T≤½ LD, the thickness dimension is 0.11 mm or less, each of the pair of covers is compositionally constituted by a single layer, and the side margin has a density which is lower than a density of the functional unit and a density of the pair of covers.

2. The multi-layer ceramic electronic component according to claim 1, wherein end portions of the internal electrodes in the second direction are positioned within a range of 0.5 μm in the second direction.

3. The multi-layer ceramic electronic component according to claim 1, wherein the functional unit includes a capacitance forming unit, and the side margin includes a larger amount of at least one of manganese or magnesium to be added than the amount in the capacitance forming unit.

4. The multi-layer ceramic electronic component according to claim 1, wherein the functional unit includes a capacitance forming unit, and the pair of covers includes a larger amount of at least one of manganese or magnesium to be added than the amount in the capacitance forming unit.

5. A multi-layer ceramic electronic component according to claim 1, wherein the t1 and the t2 are dimensions of parts in contact with the side margin.

6. The multi-layer ceramic electronic component according to claim 1, wherein the thickness dimension is equal to or smaller than a quarter of the lateral dimension.

7. A method of producing a multi-layer ceramic electronic component, comprising:

preparing an unsintered multi-layer unit including a functional unit including internal electrodes laminated in a first direction, and a pair of covers that covers the functional unit from both sides in the first direction, the unsintered multi-layer unit satisfying a relationship of $(2*t2)/t1 \geq 0.6$ after sintering, where t1 represents a dimension of the functional unit in the first direction and t2 represents a dimension of each of the pair of covers in the first direction;

producing an unsintered ceramic body by forming an unsintered side margin that covers the unsintered multi-layer unit in a second direction orthogonal to the first direction; and sintering the unsintered ceramic body, wherein the multi-layer ceramic electronic component has a thickness dimension (T) in the first direction, a dimension (W) in the second direction, and a dimension (L) in a third direction orthogonal to the first direction and the second direction, wherein the thickness dimension (T) is equal to or smaller than a half of a lateral dimension (LD) which is the dimension (W) in the second direction or the dimension (L) in the third direction, whichever is smaller, or T≤½ LD, the thickness dimension is 0.11 mm or less, each of the pair of covers is compositionally constituted by a single layer, and the unsintered side margin has a density which is lower than a density of the functional unit and a density of the pair of covers.

8. The method of producing a multi-layer ceramic electronic component according to claim 7, wherein the unsintered side margin is formed by attaching a ceramic sheet to the unsintered multi-layer unit.

9. The method of producing a multi-layer ceramic electronic component according to claim 8, wherein the unsintered side margin is formed by punching the ceramic sheet by using the unsintered multi-layer unit.

* * * * *